(12) United States Patent
Feistel (10) Patent No.: US 11,698,062 B2
(45) Date of Patent: Jul. 11, 2023

(54) OIL WIPER PACKING

(71) Applicant: BURCKHARDT COMPRESSION AG, Winterthur (CH)

(72) Inventor: Norbert Feistel, Ellikon a.d. Thur (CH)

(73) Assignee: BurckHardt CompRession AG, Winterthur (CH)

(*) Notice: Subject to any disclaimer, the term of this patent is extended or adjusted under 35 U.S.C. 154(b) by 36 days.

(21) Appl. No.: 16/328,472

(22) PCT Filed: Aug. 28, 2017

(86) PCT No.: PCT/EP2017/071582
§ 371 (c)(1),
(2) Date: Feb. 26, 2019

(87) PCT Pub. No.: WO2018/037135
PCT Pub. Date: Mar. 1, 2018

(65) Prior Publication Data
US 2020/0386218 A1 Dec. 10, 2020

(30) Foreign Application Priority Data
Aug. 26, 2016 (EP) .................................. 16185841

(51) Int. Cl.
F04B 39/04 (2006.01)
F04B 39/00 (2006.01)
F16J 9/20 (2006.01)

(52) U.S. Cl.
CPC ........ F04B 39/041 (2013.01); F04B 39/0022 (2013.01); F16J 9/20 (2013.01)

(58) Field of Classification Search
CPC ........ F04B 39/041; F04B 39/0022; F16J 9/20
See application file for complete search history.

(56) References Cited

U.S. PATENT DOCUMENTS 3,271,037 A * 9/1966 Hammond ............. F16J 15/441
277/544
3,542,374 A * 11/1970 Neilson .................... F16J 15/56
277/584

(Continued)

FOREIGN PATENT DOCUMENTS

AT 514335 B1 12/2014
CN 103075268 B 2/2015

(Continued)

OTHER PUBLICATIONS

International Search Report for PCT/EP2017/071582, Prepared by the European Patent Office, Date of completion Nov. 28, 2017, 6 pages including English Translation.

(Continued)

*Primary Examiner* — Eugene G Byrd
(74) *Attorney, Agent, or Firm* — Brooks Kushman PC; John E. Nemazi (57) ABSTRACT

An oil wiper packing for a piston rod of a crosshead piston compressor, and corresponding assembly method. The oil wiper packing has at least one chamber disc having a chamber disc cutout, wherein a wiper ring arranged in the chamber disc cutout. At least two chamber discs, each having a chamber disc cutout, are arranged in succession in a direction of extent (L), and a single wiper ring is in each chamber disc cutout. Each wiper ring has no play or only negligible play in the direction of extent (L) in the operating state but is movable in the radial direction. It is necessary to set the play in in the cold state during the assembly of the wiper rings. Such an arrangement allows advantageous wiping of oil, preventing oil from spreading in the direction of extent of the piston rod.

16 Claims, 5 Drawing Sheets

(56) References Cited

U.S. PATENT DOCUMENTS

| | | | | |
|---|---|---|---|---|
| 3,836,158 | A * | 9/1974 | Davison | F16J 15/26 277/546 |
| 4,093,239 | A * | 6/1978 | Sugahara | F16J 15/40 277/514 |
| 4,123,068 | A * | 10/1978 | Van Gorder | F16H 57/08 277/436 |
| 4,350,349 | A * | 9/1982 | McTavish | F16J 15/26 277/546 |
| 6,267,380 | B1 * | 7/2001 | Feistel | F16J 15/26 277/309 |
| 6,827,351 | B2 | 12/2004 | Graziani | |
| 6,932,351 | B1 * | 8/2005 | Mowll | F04B 39/00 277/512 |
| 9,027,934 | B2 * | 5/2015 | Lindner-Silwester | F16J 15/40 277/558 |
| 9,234,479 | B2 * | 1/2016 | Feistel | F16J 15/3212 |
| 9,410,623 | B2 * | 8/2016 | Ficht | F16J 15/004 |
| 9,568,101 | B2 * | 2/2017 | Hold | F16J 15/002 |
| 9,726,169 | B2 * | 8/2017 | Hold | F04B 53/02 |
| 2004/0227301 | A1 * | 11/2004 | Wood | F16J 15/26 277/434 |
| 2012/0211945 | A1 * | 8/2012 | Lindner-Silwester | F16J 15/56 277/508 |
| 2016/0146347 | A1 * | 5/2016 | Hunger | F16J 9/28 277/437 |

FOREIGN PATENT DOCUMENTS

| | | |
|---|---|---|
| CN | 205478181 U | 8/2016 |
| EP | 1283363 B1 | 2/2007 |
| WO | 9114890 A1 | 10/1991 |

OTHER PUBLICATIONS

AT514335 B1, English Abstract.
CN103075268 B, English Abstract.
DE60218091 T2, U.S. Pat. No. 6,827,351.
DE9190040 U1, WO9114890 with English Abstract.
International Search Report PCT/EP2017/071582, English Translation.

* cited by examiner

OIL WIPER PACKING

CROSS-REFERENCE TO RELATED APPLICATION

This application is the U.S. national phase of PCT Application No. PCT/EP2017/071582 filed on Aug. 28, 2017, which claims priority to EP Patent Application No. 16185841.0 filed on Aug. 26, 2016, the disclosures of which are incorporated in their entirety by reference herein.

DESCRIPTION

The invention concerns an oil wiper packing. The invention furthermore concerns a method for installing an oil wiper packing.

PRIOR ART

Crosshead piston compressors normally comprise a cylinder and a piston which is arranged therein and can be moved to and fro. The piston is connected to a drive device via a piston rod. The drive device normally comprises a crosshead which generates a linear motion from a rotating motion, wherein the crosshead is usually lubricated and wherein the piston rod is connected to the crosshead. In an advantageous embodiment, a crosshead piston compressor comprises at least one oil wiper packing and a seal packing, wherein the piston rod runs through the two packings. The oil wiper packing serves to wipe away lubricant from the piston rod on the crosshead side. On the cylinder side, the seal packing serves to prevent the fluid compressed in the cylinder from leaking along the piston rod. Document AT514335B1 discloses a seal packing. Documents CN103075268B and DE9190040U1 disclose oil wiper packings for the piston rod of diesel engines.

Document EP 1283363 A2 discloses such an oil wiper packing for a crosshead piston compressor. This oil wiper packing has the disadvantage that lubricating oil can pass through the oil wiper packing, which leads to a continuous oil loss which in turn may lead to damage to the crosshead mechanism. There is also a risk that lubricating oil may come into contact with the compressed fluid and contaminate this.

DESCRIPTION OF THE INVENTION

It is an object of the present invention to propose an improved oil wiper packing.

The object is achieved in particular with an oil wiper packing for a piston rod of a crosshead piston compressor, comprising
  a chamber disc having a chamber disc recess and a partition wall with a bore, wherein the partition wall laterally delimits the chamber disc recess, and wherein the bore is provided for passage of the piston rod, and comprising
  a wiper ring, wherein the wiper ring is arranged in the chamber disc recess, wherein at least two chamber discs, which each have a chamber disc recess and a partition wall, are arranged successively in a running direction and in the same orientation, and wherein a single wiper ring is arranged in each chamber disc recess.

The object is also achieved in particular with a method for installing an oil wiper packing in a crosshead piston compressor, wherein the crosshead piston compressor comprises a piston rod extending in a running direction,
  in which, in a first method step, the oil wiper packing is pre-configured in that, in a chamber disc having a chamber disc recess and having a partition wall with a bore, a wiper ring is arranged in the chamber disc recess, wherein the chamber disc recess is laterally delimited by the partition wall, and in that at least two chamber discs each with a wiper ring arranged therein are arranged successively in a running direction, and the chamber discs are connected together, and
  in which, in a second method step, the preconfigured oil wiper packing is arranged on the piston rod by a movement in the running direction such that the piston rod runs through a respective bore of the partition wall, and the chamber disc and the wiper ring surround the piston rod.

The object is also achieved in particular with an oil wiper packing for a piston rod of a crosshead piston compressor, comprising a chamber disc having a chamber disc recess, wherein a wiper ring is arranged in the chamber disc recess, wherein at least two discs each having a chamber disc recess are arranged successively in a running direction, and wherein a single wiper ring is arranged in each chamber disc recess.

The object is also achieved in particular with a method for installing an oil wiper packing in a crosshead piston compressor comprising a piston rod, wherein the oil wiper packing comprises at least two chamber discs spaced apart from each other in the running direction and having chamber disc recesses for receiving a respective wiper ring, wherein a single wiper ring is arranged in each chamber disc recess, wherein the chamber discs comprising the chamber disc recesses are fixedly connected together into a preconfigured oil wiper packing, and wherein the preconfigured oil wiper packing is installed in the crosshead piston compressor and the piston rod is introduced into the preconfigured oil wiper packing and into its wiper rings.

The oil wiper packing according to the invention for a piston rod of a crosshead piston compressor comprises at least two chamber disc recesses spaced apart from each other in the running direction, wherein a single wiper ring is arranged in each chamber disc recess. Each chamber disc has a chamber disc recess, wherein each chamber disc also comprises a partition wall which laterally delimits the chamber disc recess in the running direction on one side, wherein the partition wall has a bore through which the piston rod runs when the oil wiper packing is attached to the crosshead piston compressor. This arrangement of a single wiper ring per chamber disc recess has the advantage that the oil wiper packing allows advantageous oil wiping because the propagation of oil in the running direction of the piston rod is hindered.

The function method of the oil wiper packing according to the invention for a piston rod of a crosshead piston compressor may also be additionally improved by taking into account the following effect. It has been found that a wiper ring present in the chamber disc recess may assume at least one of the three following operating states:

1) The wiper ring can move radially inside the chamber disc recess, and has a play in the running direction of the piston rod which leads to the wiper ring moving to and fro in the running direction of the piston rod inside the chamber disc recess, which in turn has the consequence that when oil is present, the oil is pumped over the outer edge of the wiper ring from one end face to the other end face of the wiper ring, whereby under certain circumstances, a substantial quantity of oil may be extracted from the crosshead, resulting in an oil loss.

2) Because of a thermal expansion in the running direction of the piston rod, the wiper ring seizes inside the chamber disc recess so that the wiper ring is no longer movable in the radial direction. This has the consequence that the wiper ring no longer bears optimally on the surface of the piston rod, so that the wiper ring no longer seals in the axial direction and/or the wiper ring undergoes increased wear.

3) The wiper ring is advantageously arranged in the chamber disc recess such that this has a negligibly small play in the running direction of the piston rod, or the wiper ring is arranged by form fit in the chamber disc recess in the running direction of the piston rod, so that the wiper ring has no play in the running direction of the piston rod but can still move radially, which has the consequence that the wiper ring is movable radially relative to the running direction of the piston rod inside the chamber disc recess, so that the wiper ring can follow any movement of the piston rod in the radial direction and therefore advantageously bears against and seals the piston rod. This arrangement firstly has the advantage that no pumping takes place and hence there is no oil transfer over the outer edge of the wiper ring to the two end faces of the wiper ring, and oil which is present on the surface of the piston rod is preferably completely wiped off so that oil cannot come into contact with the compressed fluid on the piston side of the piston rod.

In a particularly advantageous embodiment of the invention, it is therefore ensured that in an oil wiper packing, at least one of the wiper rings has the operating state designated above as operating state 3).

The oil wiper packing according to the invention has at least two chamber discs each with a single wiper ring arranged therein, and advantageously comprises three or even more chamber discs each with a single wiper ring arranged therein.

It has been found that it is extremely difficult to determine which of the three above-mentioned operating states the respective wiper ring assumes in the chamber disc recess, since the actual operating state depends in particular on the temperature of the wiper ring or on the friction of the wiper ring on the piston rod. This is also associated with the fact that the wiper rings are usually made of or comprise plastic, and the chamber discs consist of metal. The plastic has a substantially greater thermal expansion than the metal, wherein the thermal expansion of plastic may for example be ten times greater than that of metal. Therefore depending on its heating, a wiper ring may be in any of the operating states 1), 2) or 3). The extent to which a wiper ring heats depends on various factors, such as for example operating duration, stoppage or start-up of the system, wear on the wiper ring, play originally set in the running direction of the piston rod, the oil quantity present on the piston rod, etc. It is therefore extremely complicated and difficult to guarantee that the wiper ring is in operating state 3). Therefore, in a preferred embodiment, it is necessary to ensure that the play of the wiper ring in the running direction of the piston rod is set on mounting of the oil wiper packing such that, during operation, the wiper ring as far as possible assumes operating state 3). The wiper ring and the chamber disc may be configured in a multiplicity of material pairings, in particular the pairings of metal-metal, metal-plastic, plastic-metal or plastic-plastic. The chamber disc is preferably made of a metal, e.g. cast iron or steel, or for example a plastic such as PEEK. The wiper ring is preferably made from a plastic such as PTFE, PEEK or a metal such as aluminum, bronze or brass, or a combination of plastic and metal.

The metal-metal pairing may consist of the same metal, for example aluminum, or different metals. The plastic-plastic pairing may consist of the same plastic or different plastics. Also a metal-plastic pairing is possible, in which the wiper ring is made of metal such as aluminum and the chamber disc from plastic such as PEEK.

In a particularly advantageous embodiment, on installation—which normally takes place at ambient temperature or in cold state of the crosshead piston compressor—the chamber disc, comprising the chamber disc recess and partition wall, and the wiper ring are adapted to each other such that the chamber disc recess has a chamber interior height in the running direction of the oil wiper packing which is between 0 mm and 0.5 mm greater than the height of the wiper ring, so that at ambient temperature or in cold state, the wiper ring has a form-fit connection, i.e. a play of 0 mm, or a play of between more than 0 mm to 0.5 mm. This increases the probability that during operation, the wiper ring will assume operating state 3). In an advantageous embodiment, in cold state all wiper rings have the same play. With the oil wiper packing according to the invention, the respective materials used for the chamber disc and wiper ring are known, together with the thermal expansion coefficients of the materials used. Also, the temperatures of the wiper rings to be expected during operation are often known approximately from experience values. Based on these data, it is therefore possible to calculate or define the width of the wiper ring and the width of the chamber disc recess in the running direction such that during operation, in particular after start-up of the system during a sustained operating state in which the temperatures of the wiper ring and chamber disc remain substantially constant, as far as possible operating state 3) occurs and operating state 2) is prevented as far as possible.

In a further advantageous embodiment, at least one and preferably each of the wiper rings in cold state has a different play in its chamber disc recess. The axial expansion of the wiper rings during operation is primarily dependent on the frictional heat developed, and this in turn is dependent in particular on the coefficients of friction. In the first chamber facing the drive mechanism or crosshead, the surface of the piston rod has most oil and therefore the lowest coefficient of friction. In the following chambers, the oil quantity on the surface of the piston rods reduces so that the wiper rings in the following chamber disc recess gradually transfer into dry running, which entails a significantly higher coefficient of friction and hence a higher generated frictional heat, which in turn leads to a greater thermal expansion of the wiper ring. In an advantageous embodiment, the chamber discs or wiper rings may be configured such that, in cold state or at ambient temperature, starting with the chamber on the drive mechanism side, the pairs of wiper ring and chamber disc or chamber disc recess arranged successively in the running direction of the piston rod have an increasingly larger play.

In a further advantageous embodiment, the oil wiper packing is configured such that the wiper ring has a higher thermal expansion coefficient than the chamber disc, that at ambient temperature the wiper ring has a play in the chamber disc recess in the running direction L, and that at an operating temperature $T_b$ which is higher than the ambient temperature, the wiper ring has a reduced play or a form-fit connection in the chamber disc recess.

The oil wiper packing according to the invention has the advantage that the play of the wiper ring inside the chamber disc recess can be preconfigured in the factory, or it can be assembled and checked at the operating site before installation in the crosshead piston compressor. It can thereby be ensured that the wiper rings are arranged optimally in the oil wiper packing. An oil wiper packing previously used in a crosshead piston compressor may also easily and quickly be replaced by a preconfigured oil wiper packing according to the invention. The oil wiper packing according to the invention comprises at least two chamber discs, wherein each chamber disc has a chamber disc recess and a partition wall with a bore, wherein the partition wall laterally delimits the chamber disc recess. The oil wiper packing according to the invention has the advantage that this can be preconfigured and assembled in the factory, and that in the assembled state, i.e. without dismantling, the oil wiper packing can be pushed over the piston rod of the crosshead piston compressor at the point of use. This guarantees a simple, reliable, economic, reproducible installation requiring little specialist knowledge, at the installation site of the piston compressor. The optimal play of the wiper ring in the chamber disc in cold state or at ambient temperature is dependent amongst others on the material pairing of the wiper ring and chamber disc, and is dependent amongst others on the position of the wiper ring in the running direction of the oil wiper packing. The oil wiper packing according to the invention has the advantage that all these aspects can be preconfigured in the factory, and assembly of the oil wiper packing can take place at the factory, so that the oil wiper packing need merely be installed as a preassembled part at the point of use, so as to guarantee that the wiper rings are optimally arranged inside the chamber disc recess after installation of the oil wiper packing on the piston rod.

In an advantageous embodiment, the preconfigured oil wiper packing also comprises a lateral opening which is configured and arranged such that the play of the wiper ring can still be measured when the oil wiper packing is assembled, or when the oil wiper packing is installed on the crosshead piston compressor. This has the advantage that the play of the wiper ring can also be checked immediately after installation of the oil wiper packing, or that the play of the wiper ring can be checked on later maintenance of the oil wiper packing.

The oil wiper packing according to the invention has reduced wear, it can be operated for a longer period and be replaced in a simple and economic fashion, and it also leads to shorter machine stoppages and machine downtimes.

The invention is described below with reference to several exemplary embodiments.

BRIEF DESCRIPTION OF THE DRAWINGS

The drawings used to explain the exemplary embodiments show.

In principle, the same parts carry the same reference signs in the drawings.

WAYS OF IMPLEMENTING THE INVENTION

Figure 1:
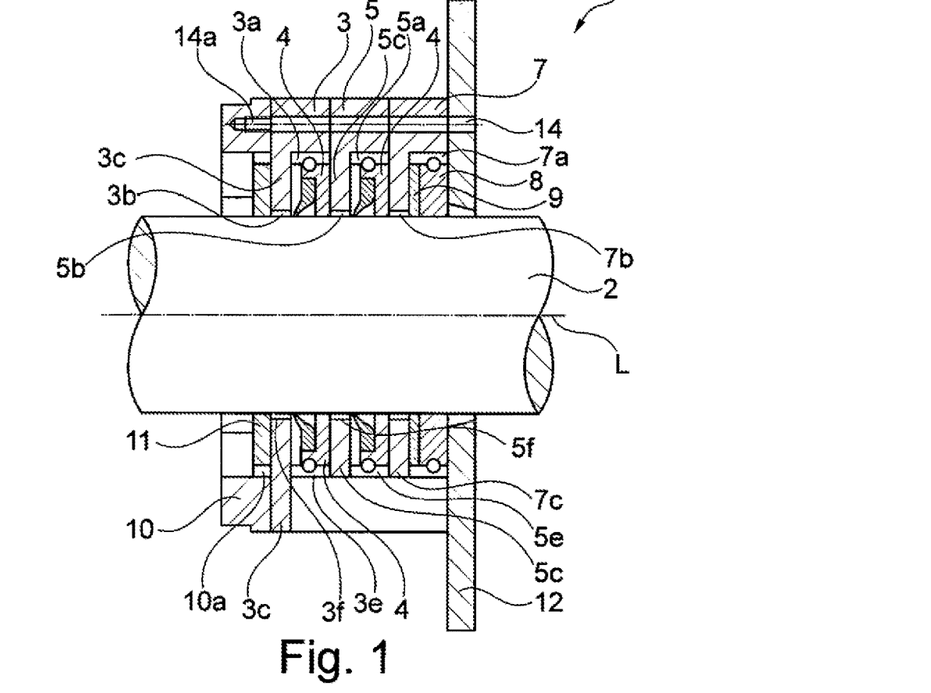
FIG. 1 a longitudinal section through an oil wiper packing.

FIG. 1 shows an oil wiper packing 1 for a piston rod 2 of a crosshead piston compressor, which piston rod runs in a longitudinal direction L and is movable to and fro. The oil wiper packing 1 comprises two chamber discs 3, 5 arranged successively in the longitudinal direction L and each comprising a chamber disc recess 3a, 5a and a partition wall 3c, 5c with a bore 3f, 5f, wherein the partition wall 3c, 5c laterally delimits the chamber disc recess 3a, 5a, and wherein the bore 3f, 5f is provided for passage of the piston rod 2. A chamber disc 3, 5 has a respective partition wall 3c, 5c. A single wiper ring 4 is arranged in each chamber disc recess 3a, 5a. As evident from FIG. 1, at least two chamber discs 3, 5, each comprising a chamber disc recess 3a, 5a and a partition wall 3c, 5c, are arranged successively in a running direction L and with the same orientation, wherein a single wiper ring 4 is arranged in each chamber disc recess 3a, 5a. The two chamber discs 3, 5 are oriented similarly or identically in the running direction L, wherein the partition wall 3c, 5c is arranged on the left of each chamber disc 3, 5 and the chamber disc recess 3a, 5a follows in the running direction L.

Figure 7:
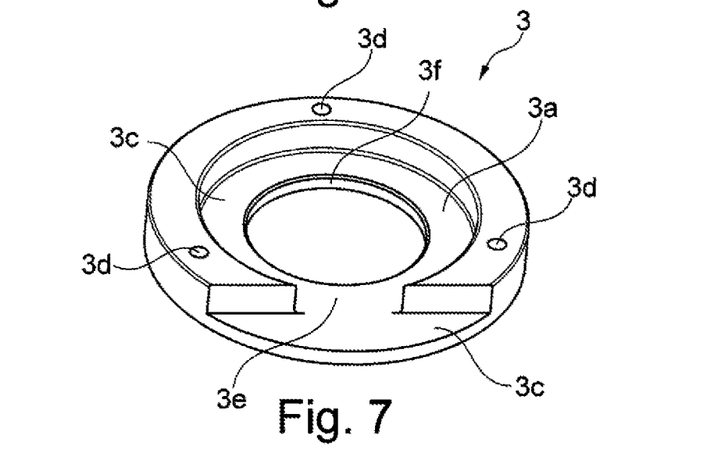
FIG. 7 a perspective view of a chamber disc with partition wall.
Figure 8:
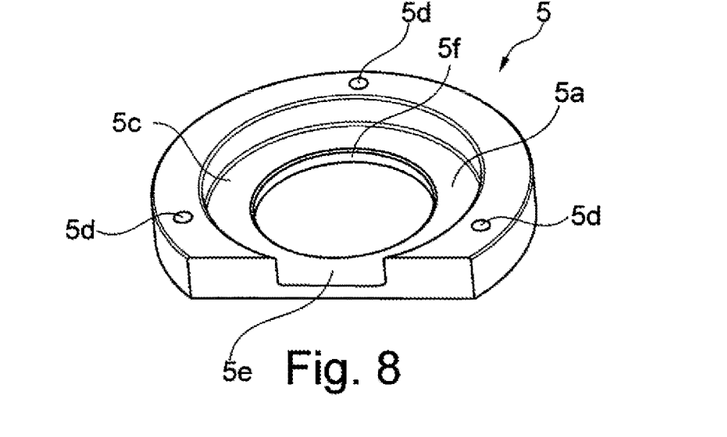
FIG. 8 a perspective view of a further embodiment of a chamber disc.

In an advantageous embodiment, the oil wiper packing 1 also comprises a fixing plate 12 which is connected to at least the two chamber discs 3, 5, for example via a screw (not shown) running through the bore 13 and the thread 14a, so that the two chamber discs 3, 5 are connected fixedly and releasably to the fixing plate 12 by means of the screws. Advantageously, the chamber discs 3, 5 have an outlet opening 3e, 5e through which the wiped oil can escape. Advantageously, the outlet opening 3e, 5e is oriented downwards, preferably in the vertical direction. In an advantageous embodiment, the oil wiper packing 1 may also—as shown in FIG. 1—comprise additional components such as for example a chamber disc 10, comprising a pre-wiper chamber 10a for receiving a pre-wiper 11 or a choke ring 11, and/or a chamber disc 7 with sealing ring 8 arranged therein, and in some cases also a preload element 9 arranged next to the sealing ring 8 and serving for axial preload of the sealing ring 8, so that the sealing ring 8 bears on the sealing surface in a stable fashion. The chamber disc 7 has a partition wall 7c, and the partition wall 7c has a gap 7b towards the piston rod 2. The preload element may for example comprise a plate and several coil springs running in the longitudinal direction L, or may for example be configured as a cup spring. The chamber discs 3, 5 have a gap 3b, 5b towards the surface of the piston rod 2, so that the piston rod 2 is arranged contactlessly relative to the chamber discs 3, 5, and the piston rod 2 can also move slightly in the radial direction. FIGS. 7 and 8 show the chamber discs 3, 5 from FIG. 1 in detail in a perspective view. The chamber disc 3, 5 comprises the sealing plate or a partition wall 3c, 5c, wherein the partition wall 3c bears against the chamber disc 10 of the pre-wiper 11. In an advantageous embodiment, chamber discs 3, 5, 7 arranged successively in the running direction L adjoin each other in such a fashion that the chamber disc recess 3a, 5a is fluid-tight with the exception of the outlet opening 3e, 5e and the bores 3f, 5f, so that the oil wiped away by the wiper ring 4 arranged in the respective chamber disc 3, 5 is discharged as far as possible exclusively via the outlet opening 3e, 5e. The chamber discs 3, 5 have bores 3d, 5d which, in the assembled state shown in FIG. 1, form a bore 14 running through all chamber discs 3, 5, 7, in order to hold the chamber discs together by a fixing means such as a screw.

Figure 5:
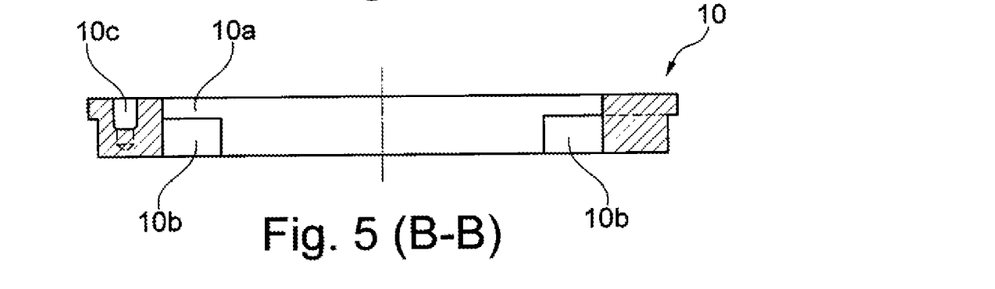
FIG. 5 a longitudinal section through a pre-wiper chamber disc.
Figure 6:
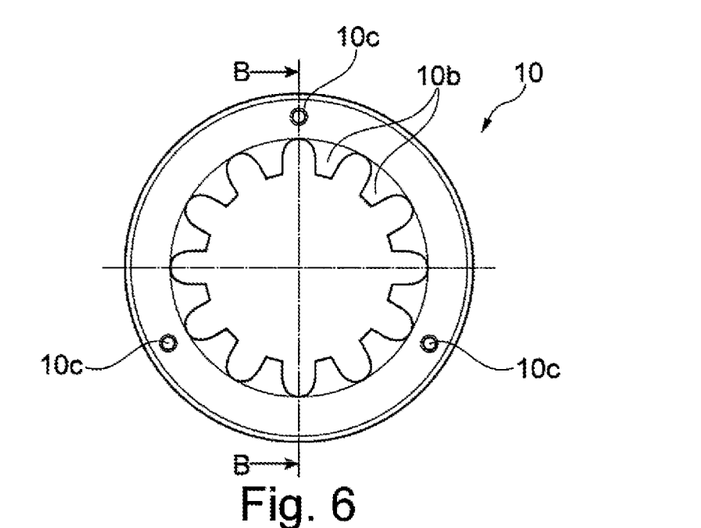
FIG. 6 a top view of the pre-wiper chamber disc from FIG. 5.

FIG. 6 shows a top view of the chamber disc 10 comprising a plurality of holding parts 10b spaced apart in the peripheral direction and protruding radially, and comprising three bores 10c. FIG. 5 shows a section through FIG. 6 along section line B-B. The pre-wiper 11 (not shown) is arranged in the pre-wiper chamber 10a. Since the contact area formed by the chamber disc 3 is larger than the contact area formed by the protruding holding parts 10b, the pre-wiper 11 tends to bear primarily against the contact face of the chamber disc 3.

Figure 3:
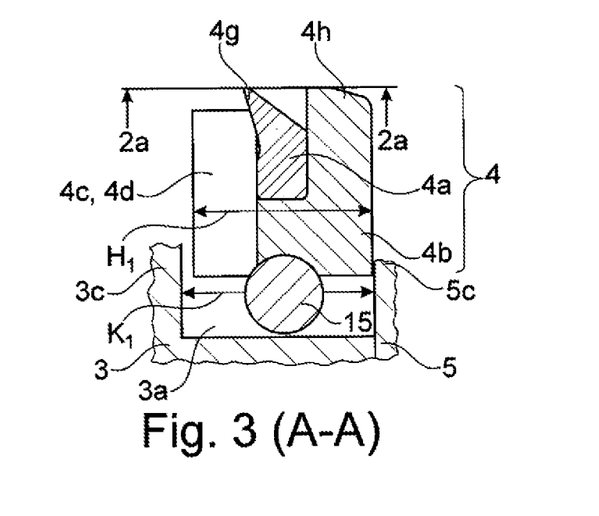
FIG. 3 a longitudinal section through a wiper ring.
Figure 4:
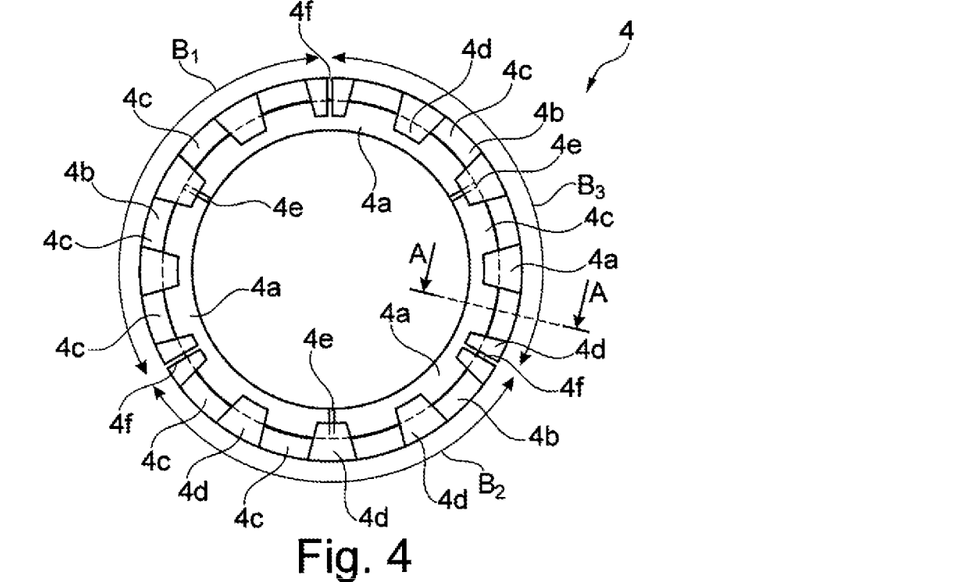
FIG. 4 a top view of the wiper ring from FIG. 3.

FIG. 4 shows an exemplary embodiment of a wiper ring 4, and FIG. 3 shows a section of the wiper ring 4 along section line A-A, wherein FIG. 3 also shows to some extent the chamber discs 3, 5 and chamber disc recess 3a. The wiper ring 4 may be configured in many ways, so the exemplary embodiment shown constitutes merely one example of a multiplicity of possibilities. In a particularly advantageous embodiment, the wiper ring 4 lies flat, as shown in FIGS. 1 and 3, and preferably over the full surface, on the next chamber disc 5, 7 in the longitudinal direction L, so that no oil or very little oil can penetrate through the contact point at this flat contact point. The wiper ring 4 shown comprises three, preferably metallic, wiper blades 4a arranged successively in the circumferential direction, with blade tips 4g and joining points 4e, wherein the wiper blades 4a are held in a holding device 4b comprising three holding device parts. The holding device 4b preferably consists of plastic. The three holding device parts, which are arranged successively in the circumferential direction and form a joining point 4f, extend along B1, B2 and B3. As shown in FIG. 3, the holding device 4b is formed U-shaped and has two radial portions, a radial supporting part 4h which preferably extends up to the surface 2a of the piston rod 2, and a radial holding part 4d which may also extend up to the surface 2a of the piston rod 2, but which preferably—as shown in FIG. 3—ends at a distance from surface 2a. The radial supporting part 4h extends in the circumferential direction preferably over the entire angle of B1, B2 or B3. Each of the three holding device parts of the holding device 4b advantageously comprises several radial holding parts 4d which—as shown in FIGS. 3 and 4—are mutually spaced apart in the circumferential direction, preferably forming a radial discharge channel 4c. As evident in FIG. 3, the oil present on the surface 2a of the piston rod 2 is wiped away by the blade tip 3g bearing on the piston rod 2, wherein the wiped oil is conveyed via the discharge channel 4c into the radially outer region of the interior 3a and preferably discharged via the outlet opening 3e. The wiper ring 4 preferably comprises a peripheral spring 15 lying on the outside along the holding device 4b, as shown only in FIG. 3. As FIG. 3 shows, the wiper ring 4 has a wiper ring height H1, and the chamber disc recess 3a has a chamber interior height K1 in the running direction L. In an advantageous embodiment, the chamber interior height K1 in the running direction L is larger by between 0 mm and 0.5 mm than the wiper ring height H1. This applies in particular at ambient temperature. In a further possible embodiment, the entire wiper ring 4 may also consist solely of metal or solely of plastic. In a further possible embodiment, the entire wiper ring 4 could also be designed to be endless, i.e. running through 360°. Also, the wiper ring could be configured to be integral, and/or consist solely of metal or solely of plastic, and/or consist solely of the same material.

Figure 2:
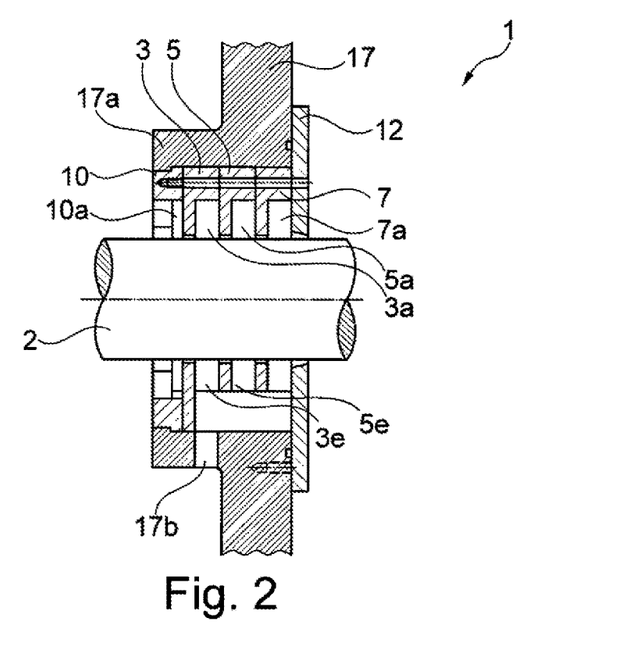
FIG. 2 the oil wiper packing from FIG. 1 installed in a housing.

The oil wiper packing 1 is preferably supplied fully configured for installation in a crosshead piston compressor, in that in the factory the chamber discs 3, 5 are arranged successively in the running direction L and connected together, wherein a single wiper ring 4 is arranged in each chamber disc recess 3a, 5a, and wherein each wiper ring 4 has a play in the range of between more than 0 mm and 0.5 mm in the running direction L inside the chamber disc 3, 5. The wiper ring 4 could also be arranged by form fit in the chamber disc 3, 5, and therefore have no play or a play of 0 mm in the running direction L. Preferably, the chamber disc 3 has a lateral outlet opening 3e oriented perpendicularly to the running direction L, so that the chamber disc recess 3a is accessible from the outside, wherein the outlet opening 8 is preferably arranged such that the play of the wiper ring 4 in the chamber disc recess 3a can be measured. Preferably, the oil wiper packing 1 comprises a fixing plate 12 which has a larger outer diameter than the chamber disc 3, wherein the chamber discs 3, 5 are arranged following the fixing plate 12 in the running direction L. FIG. 2 shows such an embodiment. In FIG. 2, the two wiper rings 4, the pre-wiper 11, the sealing ring 8 and the preload element 9 would also have to be arranged as shown in FIG. 1, in order to form a complete oil wiper packing 1. These elements are present in themselves in FIG. 2 but not shown, so that the remaining features are more clearly evident. This oil wiper packing 1 has the advantage that this can be inserted, preferably in assembled state, in a housing 17, preferably an intermediate housing of the crosshead piston compressor, in that the oil wiper packing 1 is pushed over the piston rod 2 so that the piston rod 2 runs through the bores 3f, 5f and the wiper rings 4. The housing 17 advantageously comprises a flange-like part 17a for receiving the oil wiper packing 1, and advantageously comprises an outlet 17b for discharging the wiped oil.

Figure 9:
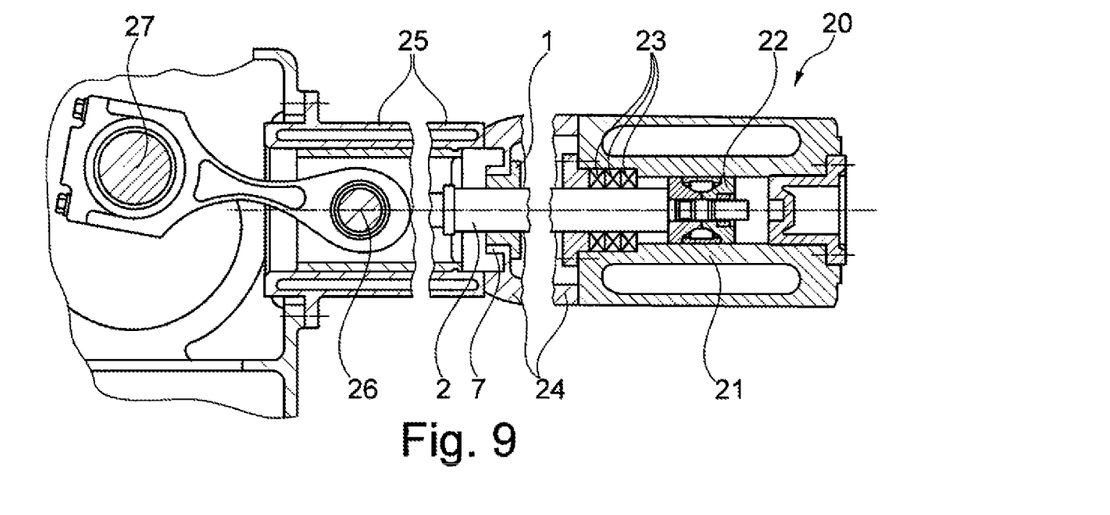
FIG. 9 a longitudinal section through a piston compressor.

FIG. 9 shows a longitudinal section through a crosshead piston compressor 20 comprising a cylinder 21, a piston 22 with piston rod 2 attached thereto, a seal packing 23, an intermediate housing 24, a crankshaft housing 25, a crosshead 26, a crankshaft 27 and further components (not shown in detail). The oil wiper packing 1 according to the invention is attached to the intermediate housing 24, wherein the piston rod 2 runs through the oil wiper packing 1. The oil wiper packing 1 according to the invention has the advantage that this is preferably formed as a replacement part and preconfigured, and therefore can be mounted in preconfigured state in the intermediate housing 24.

The preconfigured oil wiper packing 1 comprises at least two chamber discs 3, 5 spaced apart from each other in the running direction L and having chamber disc recess 3a, 5a for receiving a respective wiper ring 4, wherein one wiper ring 4 is arranged in each chamber disc recess 3a, 5a, wherein the chamber discs 3, 5 comprising the chamber disc recess 3a, 5a are fixedly connected together to form the preconfigured oil wiper packing 1. A preconfigured oil wiper packing 1 is advantageously installed such that the oil wiper packing 1 is fitted in the crosshead piston compressor 20, and then the piston rod 2 is inserted in the preconfigured oil wiper packing 1 and in its wiper rings 4. In this way, it is ensured in particular that the play of the wiper rings 4 inside the chamber discs 3, 5 no longer changes during installation. Advantageously, the wiper ring 4 has a wiper ring height H1 in the running direction L, and the wiper ring 4 and the chamber disc recess 3a are configured such that the wiper ring 4 has a play in the range of between more than 0 mm and 0.5 mm in the running direction L inside the chamber disc recess 3a.

Figure 11:
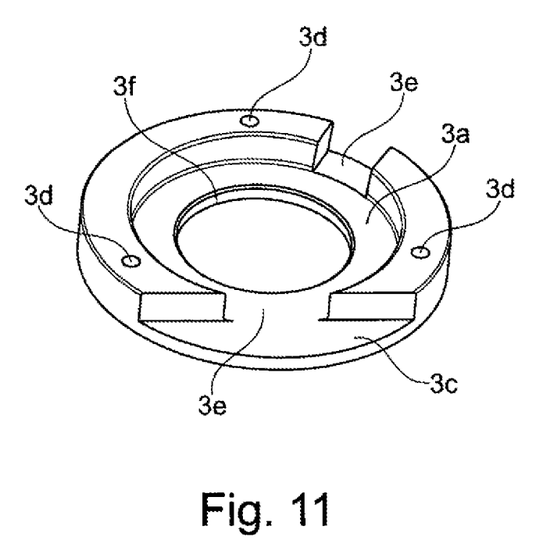
FIG. 11 a perspective view of a further embodiment of a chamber disc with partition wall.

Advantageously, the chamber disc 3, 5, as shown in FIG. 11, has at least one and advantageously several lateral outlet openings 3e which are configured such that the chamber disc recess 3a is accessible from the outside, so that the play of the wiper ring 4 in the chamber disc recess 3a can be measured via the outlet opening 3e. The outlet openings 3e may also serve for outflow of the wiped oil, wherein an outlet opening 3e is arranged preferably so as to run vertically downward so that the wiped oil can flow away downward.

Figure 10:
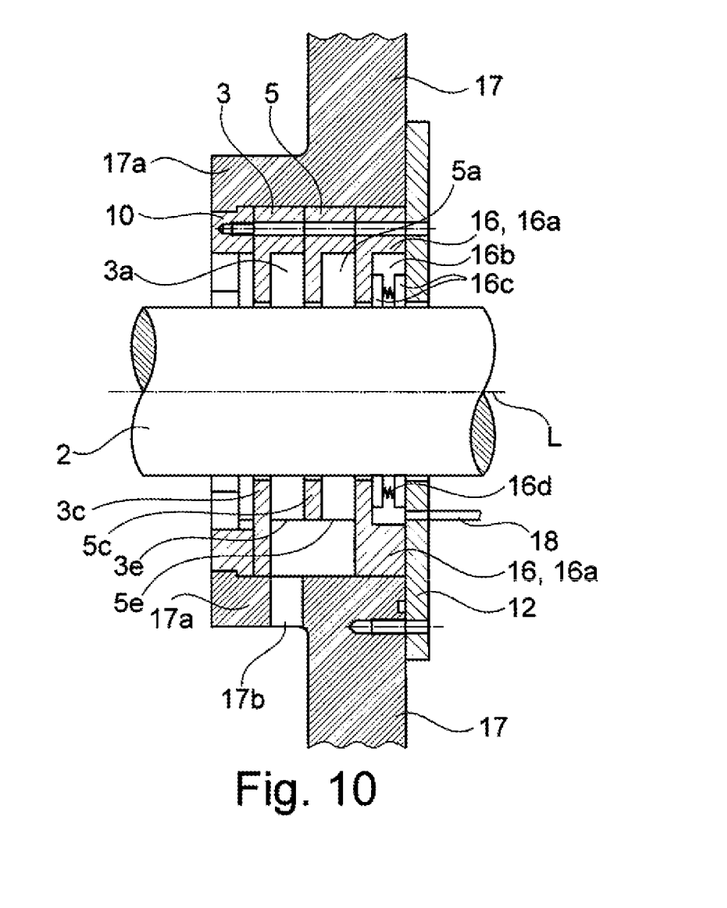
FIG. 10 a longitudinal section through a further exemplary embodiment of an oil wiper packing.

FIG. 10 shows a further exemplary embodiment of an oil wiper packing. As in FIG. 2, in FIG. 10 also the two wiper rings 4, the pre-wiper 11, the sealing ring 8 and the preload element 9 (present in themselves) are not shown, so that the remaining features are more clearly evident. In contrast to the oil wiper packing 1 shown in FIG. 2, the oil wiper packing 1 shown in FIG. 10 comprises, following the fixing plate 12, a sealing medium barrier 16 comprising a barrier chamber disc 16a with a barrier interior space 16b, wherein two sealing elements 16c are arranged in the barrier interior space 16b and mutually spaced apart in the running direction L via a spring 16d, and wherein a supply line 18 for a fluid opens into the barrier interior space 16b in order to form a gas-tight barrier in the running direction L.

The invention claimed is:

1. An oil wiper packing for a piston rod of a crosshead piston compressor, configured to wipe away lubricant from the piston rod on the crosshead side, comprising:
   a plurality of chamber discs, each chamber disc having a chamber disc recess and a partition wall with a bore, wherein the partition wall laterally delimits the chamber disc recess, and wherein the bore is provided for passage of the piston rod, and
   a plurality of wiper rings each arranged in the chamber disc recess,
   wherein at least two chamber discs, which each have a chamber disc recess and a single partition wall, are arranged successively in a running direction (L), and having only a single wiper ring is arranged in each of the two chamber disc recess, and wherein the at least two chamber discs are arranged in the same orientation in the running direction (L),
   wherein the single wiper rings each have a single wiper blade in the running direction (L) for contacting the piston rod, wherein the chamber disc recess has a chamber interior height (K1) in the running direction (L), that the wiper ring has a wiper ring height (H1) in the running direction (L), and that at ambient temperature, the chamber interior height (K1) is between 0 mm and 0.5 mm larger than the wiper ring height (H1), and wherein the wiper rings of at least two successive pairs of wiper ring and chamber disc succeeding each other in the running direction (L) have a different play.

2. The oil wiper packing as claimed in claim 1, wherein each wiper ring has a play in the range of between more than 0 mm and 0.5 mm in the running direction (L) inside the respective chamber disc at ambient temperature.

3. The oil wiper packing as claimed in claim 1, wherein the chamber disc and the wiper ring have a thermal expansion coefficient, that the wiper ring has a higher thermal expansion coefficient than the chamber disc, that the wiper ring has a play in the running direction (L) in the chamber disc recess at ambient temperature, and that at an operating temperature ($T_b$) which is higher than the ambient temperature, the wiper ring has a reduced play or a form-fit connection in the chamber disc recess.

4. The oil wiper packing as claimed in claim 1, wherein the wiper rings of successive pairs of wiper ring and chamber disc in the running direction (L) have an increasingly larger play.

5. The oil wiper packing as claimed in claim 1, wherein the oil wiper packing is fully configured for installation in a crosshead piston compressor, in that the chamber discs are arranged successively in the running direction (L) and are connected together, that a single wiper ring is arranged in each chamber disc recess, and that each wiper ring has a play in the range of between more than 0 mm and 0.5 mm in the running direction (L) inside the chamber disc.

6. The oil wiper packing as claimed in claim 5, wherein each of the chamber discs has a lateral outlet opening oriented perpendicularly to the running direction (L), so that the chamber disc recess is accessible from the outside, wherein the outlet opening is arranged such that the play of the wiper ring in the chamber disc recess can be measured.

7. The oil wiper packing as claimed in claim 5, wherein it comprises a fixing plate which has a larger outer diameter than each of the chamber discs, and that the chamber discs are arranged following the fixing plate in the running direction (L).

8. The oil wiper packing as claimed in claim 7, wherein a chamber disc with an interior space is arranged following the fixing plate in the running direction (L), and that a gas-tight sealing arrangement is arranged in the interior space.

9. The oil wiper packing as claimed in claim 7, wherein a pre-wiper chamber disc comprising a pre-wiper chamber is arranged following the chamber discs in the running direction (L), and that a pre-wiper is arranged in the pre-wiper chamber.

10. The oil wiper packing as claimed in claim 7, wherein a sealing medium barrier is arranged following the fixing plate in the running direction (L) and comprises a barrier chamber disc with a barrier interior space, wherein two sealing elements are arranged in the barrier interior space and mutually spaced apart in the running direction (L), and wherein a supply line for a fluid opens into the barrier interior space between two sealing elements in order to form a gas-tight barrier in the running direction (L).

11. The oil wiper packing as claimed in claim 5, wherein each wiper ring has two discharge channels running in the radial direction and extending over the entire width of the wiper ring in the radial direction.

12. A method for installing an oil wiper packing in a crosshead piston compressor, wherein the crosshead piston compressor comprises a piston rod extending in a running direction (L),
   wherein
   in a first method step, assembling an oil wiper packing having a plurality of chamber discs each with a chamber disc recess and having each a partition wall with a bore, and having only a single wiper ring having a wiper blade for contacting the piston rod is arranged in the chamber disc recess, wherein the chamber disc recess is laterally delimited by the partition wall, wherein at least two chamber discs with only a single wiper ring arranged in each chamber disc are arranged successively in a running direction (L) in the same position, and the chamber discs are connected together, wherein each of the chamber disc recesses has a chamber interior height (K1) in the running direction (L), that each of the wiper rings has a wiper ring height (H1)

in the running direction (L), and that each wiper ring and each chamber disc recess are combined such that at ambient temperature, the chamber ring interior height (K1) is between 0 mm and 0.5 mm greater than the wiper ring height (H1), and wherein the wiper rings of at least two successive pairs of wiper ring and chamber disc succeeding each other in the running direction (L) have a different play, and in a second method step, arranging the preconfigured oil wiper packing on the piston rod form movement in the running direction (L) such that the piston rod runs through a respective bore of the partition wall, and the chamber disc and the wiper ring surround the piston rod.

13. The method as claimed in claim 12, wherein the wiper ring has a play in the range of between more than 0 mm and 0.5 mm in the running direction (L) inside the chamber disc recess.

14. The method as claimed in claim 12, wherein the wiper ring has a higher thermal expansion coefficient than the chamber disc, that the wiper ring has a play in the running direction (L) in the chamber disc recess at ambient temperature, and that at an operating temperature ($T_b$) which is higher than the ambient temperature, the wiper ring has a reduced play or a form-fit connection in the chamber disc recess.

15. The method as claimed in claim 12, wherein the chamber disc has at least one lateral outlet opening oriented perpendicularly to the running direction (L), so that the chamber disc recess is accessible from the outside, and that the play of the wiper ring in the chamber disc recess is measured via the outlet opening.

16. An oil wiper packing as claimed in claim 1, wherein the single wiper rings each have a single peripheral spring for biasing the wiper ring inwardly.

* * * * *